Feb. 7, 1961 C. C. HORNE 2,970,368
HOLLOW TURBINE OR COMPRESSOR BLADES
Filed May 15, 1958 2 Sheets-Sheet 1

PRIOR ART

CAMPBELL C. HORNE
INVENTOR.

BY [signature]

ATTORNEY

Feb. 7, 1961 C. C. HORNE 2,970,368
HOLLOW TURBINE OR COMPRESSOR BLADES
Filed May 15, 1958 2 Sheets-Sheet 2

CAMPBELL C. HORNE
INVENTOR.

BY *(signature)*
ATTORNEY

United States Patent Office 2,970,368
Patented Feb. 7, 1961

2,970,368

HOLLOW TURBINE OR COMPRESSOR BLADES

Campbell Clouston Horne, Giffnock, Scotland, assignor to The International Nickel Company, Inc., New York, N.Y., a corporation of Delaware Filed May 15, 1958, Ser. No. 735,503

Claims priority, application Great Britain May 23, 1957

3 Claims. (Cl. 29—156.8)

The present invention relates to the manufacture of fluid-cooled turbine blades and, more particularly, to the manufacture of a turbine or compressor blade with an integral root and internal cooling passages by the partial extrusion of a billet or the like with longitudinal holes filled with a material that flows with the metal and can be removed after the extrusion.

It has been proposed to manufacture turbine blades by a method in which filled holes are made blind so that they extend only a little way into that part of the metal which, upon extrusion, will form the root and consequently will not pass through the extrusion die; and after the extrusion, holes of cross section different from that of the blind holes are made in the root to connect with the original holes. As a result, the part of the billet in which the closed ends of the blind holes lie is undisturbed during the extrusion, so the parts of these holes in it are likewise undisturbed positionally. Therefore, the position of the holes in the root is known with accuracy and this is of considerable advantage, as the holes can be reached with certainty by drilling.

In U.S. application Serial No. 715,977 a modification of this method has been described. In that part of the billet which is to form the blade proper, filled holes are still (in the modified method) made which extend only a little way into the part which is to form the root, but before the extrusion, holes of smaller cross section are drilled through the part which is to form the root to meet the other holes and are subsequently filled.

Although this modified method presents certain advantages in overcoming difficulties arising in the original process, it brings with it several further difficulties when the cooling passages are required to lie on a curve in the extruded blade but on a straight line at the bottom of the finished root. One of these difficulties will be readily understood by reference to Figures 1 to 4 of the accompanying drawing. Figures 1 and 2 are cross sections through a rectangular billet 11 and Figure 3 shows the airfoil section 12 with holes on a curve which must be produced by extrusion of the billet. In the leading end of the billet, holes 13 of larger cross section are drilled and in the trailing end of the billet, holes 14 of smaller cross section are drilled to meet the holes 13 as shown in Figure 4, which is a sectional view of the billet. The holes 13 lie on a curve and the holes 14 lie on a straight line at the base of the proposed final root. To make the holes 14 meet the holes 13 is very difficult in that the angles vary from hole to hole and in the finished blade proper the holes are disposed fanwise, whereas in the free end of the final machined root they must lie in a straight line. This operation alone is difficult enough but there is an added disadvantage, namely that the extrusion of the blade must be stopped within very close limits of accuracy in order to prevent the holes 14 from being reduced in area by passage of the root metal through the die. Further, if it is desired to drill holes 14 after extrusion, the length of the extended root left in the extrusion container must be accurate if it is desired that holes 14 meet holes 13 with any workable degree of reproducibility. When a billet as shown in Figs. 1 and 2 is partly extruded to an airfoil section such as shown in Fig. 3, an additional disadvantage occurs, to wit, extrusions die life is severely limited. The convex side of the extrusion die wears more rapidly than the concave side and the wear on said convex side takes place by a means which is particularly undesirable. The convex surface of the orifice rolls over after very few extrusions thus reducing the size of the die at the entry to the orifice and results in the formation of a neck at the root end of the extruded airfoil. Wear on the concave side of the die takes the form of an increase in radius between root and blade and can therefore be tolerated to a greater degree.

Although attempts were made to overcome the foregoing difficulties and other disadvantages, none, as far as I am aware, was entirely successful when carried into practice commercially on an industrial scale.

It has now been discovered that by the use of a special sequence of process steps, the aforementioned difficulties may be avoided.

It is an object of the present invention to provide a novel process for the production of hot worked turbine blade blanks having integral root portions and having cooling passages extending through the root portion and blade portions thereof.

Another object of the invention is to provide a novel process for the production of turbine blades having integral roots and having cooling passages extending spanwise through said blades from the root to the tip thereof.

Other objects and advantages will become apparent from the following description taken in conjunction with the accompanying drawing in which.

Generally speaking, the present invention contemplates a process wherein an elongated billet, advantageously parallelepipedal in shape, of heat-resistant metal having a predetermined root portion and blade portion is provided with a plurality of blind filled holes of large cross-sectional area extending through the blade portion and into the root portion. These blind filled holes lie in a substantially straight line across any section of the blade portion and each one is substantially parallel to the longitudinal axis of the parallelepipedal billet. A plurality of filled holes of smaller cross-sectional area are then provided in the root portion of the billet, each one extending from the exterior of the root portion to connect with the blind end of one of the originally formed blind holes. The smaller holes also lie substantially on a straight line across sections of the root portion of the billet. The straight line on which the small holes lie is substantially parallel to the straight line on which the larger holes lie. Advantageously, the small holes are coaxial with the larger holes. The billet is then partially extruded longitudinally, blade partion leading, through a die to provide an extruded section of special shape having the required cross-sectional area of the final blade and having the originally formed holes reduced in cross-sectional area but still lying substantially in a straight line, and to provide an unextruded root portion. The extent of extrusion is usually closely controlled for reasons of economy but may vary so long as the smaller filled holes in the root portion are not unduly constricted. Thereafter, the blade portion is forged or pressed to the required cross-sectional blade shape. The end of the root portion adjacent the blade portion may also be forged to avoid shearing the metal at the blade-root junction. In other words, according to the present invention both sets of holes are drilled on straight lines and the billet is partly extruded through a die which is not of airfoil section but which leaves the larger holes substantially in a straight line while converting the metal of the blade proper to the desired cross-sectional area. The extruded section has a substantially plano-convex configuration, i.e., the lateral surfaces thereof are either planar or convexly curved. Advantageously the extruded sections are either substantially sole-shaped or wedge-shaped. Thereafter, the blade portion is forged to cambered section with the holes in cross section lying on a curve.

Figure 1:
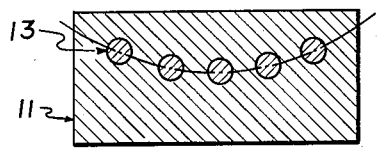
Figures 1 through 4 illustrate a prior proposal as set forth and discussed hereinbefore.
Figure 2:
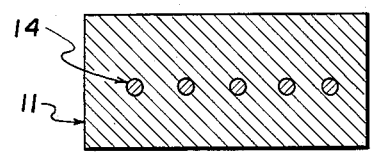
Figure 3:
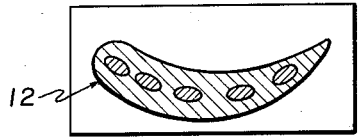
Figure 4:
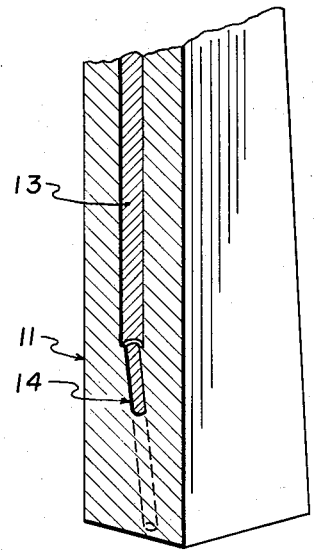
Figure 5:
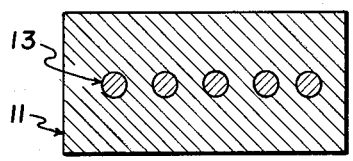
Fig. 5 depicts in cross section the blades portion of a drilled and filled billet as contemplated in accordance with the present invention.
Figure 6:
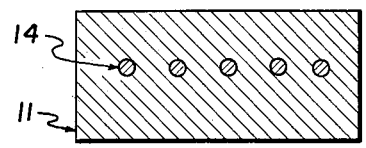
Fig. 6 shows a cross-sectional view of the root portion of the billet of Fig. 5.
Figure 7:
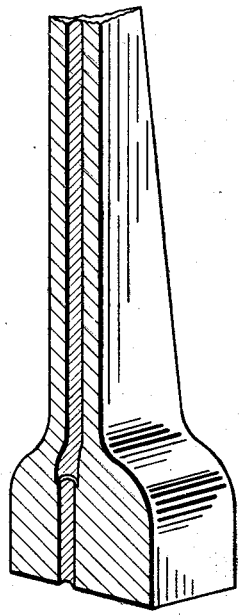
Fig. 7 is a longitudinal sectional view of the billet of Figs. 5 and 6 after an extrusion operation in accordance with the present invention.
Figure 8:
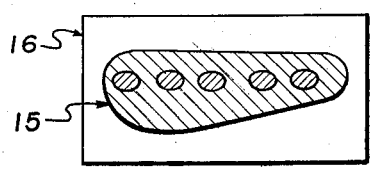
Fig. 8 shows a cross section through the extruded portion of the partially extruded billet of Fig. 7.
Figure 9:
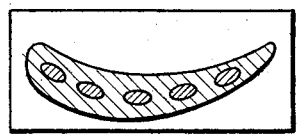
Fig. 9 is a section corresponding to Fig. 8 after a forging operation as contemplated by the present invention.

In carrying the invention into practice, it is advantageous to employ the process of the invention as diagrammatically illustrated in Figs. 5 through 9 of the accompanying drawing. Referring now thereto, it is to be observed that Figures 5 and 6 are comparable to the aforementioned Figures 1 and 2 but it will be seen that the holes 13 are now drilled on a straight line. Both the holes 13 and 14 can now be easily drilled on a vertical drilling machine without setting up for drilling at complicated and varying angles. After the holes have been filled, the billet is partly extruded to produce a blank portion 15 for the blade proper while a blank portion 16 for an integral root remains unextruded. The section of the blank portion 15 is shown in Fig. 8. It has no camber, is flat along one side and has substantially no concave lateral surfaces. The extruded product can easily be removed from the die and after trimming to length is placed in a forging die of airfoil section in which it is bent to take up the required shape of the blade 17 as shown in Fig. 9 with very little change in chordal width.

If desired, the blank 15 may be tapered longitudinally before the forging in the die, either by machining or by gap rolling.

In the final blade, the passages are on the desired curve as shown in Fig. 9, along the blade proper, but they lie in a straight line in the root.

The present invention is particularly applicable to the production of air-cooled turbine blades from heat resistant metal.

With respect to the manufacture of turbine blades by means of the novel process, it should be understood that the term "heat-resistant metal" is used to include austenitic nickel-chromium alloys, including nickel-chromium-iron and nickel-chromium-cobalt and cobalt-chromium alloys, including cobalt-chromium-iron alloys, which contain a total of at least about 25% nickel plus chromium, cobalt plus chromium or nickel plus chromium plus cobalt (i.e., a total of at least about 25% of chromium plus nickel and/or cobalt), in addition to small amounts of aluminum, titanium, molybdenum, tungsten, niobium, tantalum, silicon, manganese, zirconium and boron which may optionally be present in the alloys. The remainder of the alloy, if any, would be iron. These alloys are adapted to be subjected in use to temperatures up to about 700° C. or above and, accordingly, must be hot worked at temperatures around 1200° C. Fillers adapted to cooperate with such heat-resistant metal may be ferritic alloys of iron, manganese and titanium containing from about 5% to about 20% manganese, about 1% to about 10% titanium with the balance essentially iron. These steel filler materials are described and claimed in the Betteridge U.S. application Serial No. 509,380, now Patent No. 2,941,281. Other advantageous filler materials are metal-ceramic mixtures having a continuous metal phase and containing about 5% to about 25% ceramic material, e.g., magnesia and the balance metal, e.g., iron. Such metal-ceramic fillers are described and claimed in the Hignett U.S. application Serial No. 472,755, now Patent No. 2,891,307.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A process for the production of a fluid-cooled turbine blade blank which comprises providing an elongated billet having a predetermined blade portion and a predetermined root portion, forming and filling a plurality of blind holes substantially parallel to the axis of said billet and lying in a straight line across a section of said billet so that the holes extend through the blade portion of said billet and into the root portion thereof, forming and filling a plurality of smaller holes lying substantially in a straight line across sections of the root portion of the billet, said line being substantially parallel to the line of the larger formed and filled holes and each of said smaller holes extending substantially axially from the free end of the root portion to connect with the blind end of one of said larger filled holes, thereafter partially extruding said billet with blade portion leading to provide an extruded blade portion having filled holes lying in a straight line across a section having a substantially plano-convex shape and having the cross-sectional area required in the final blade and to provide an unextruded root portion and thereafter, forging said extruded blade portion to provide a blade blank having an airfoil section blade portion with holes lying substantially on an arc and an integral root with holes lying substantially on a straight line.

2. A process as set forth and defined in claim 1 wherein the blade portion of the billet is extruded to form a substantially wedge-shaped section.

3. A process as set forth and defined in claim 1 wherein the blade portion is extruded to form a substantially sole-shaped section.

References Cited in the file of this patent
UNITED STATES PATENTS

| 2,013,622 | Bedford | Sept. 3, 1935 |
| 2,856,675 | Hansen | Oct. 21, 1958 |

FOREIGN PATENTS

| 664,614 | Great Britain | Jan. 9, 1952 |
| 1,072,391 | France | Mar. 17, 1954 |
| 755,610 | Great Britain | Aug. 22, 1956 |

UNITED STATES PATENT OFFICE
CERTIFICATION OF CORRECTION

Patent No. 2,970,368                               February 7, 1961

Campbell Clouston Horne

It is hereby certified that error appears in the above numbered patent requiring correction and that the said Letters Patent should read as corrected below.

Column 2, line 5, for "extrusions" read -- extrusion --; line 37, for "blades" read -- blade --; line 69, for "partion" read -- portion --.

Signed and sealed this 15th day of August 1961.

(SEAL)
Attest:

ERNEST W. SWIDER                            DAVID L. LADD
Attesting Officer                               Commissioner of Patents